(12) United States Patent
Gould et al.

(10) Patent No.: US 7,577,421 B2
(45) Date of Patent: Aug. 18, 2009

(54) SYSTEMS AND METHODS FOR DISTRIBUTED PROCESSING OF LOCATION INFORMATION ASSOCIATED WITH EMERGENCY 911 WIRELESS TRANSMISSIONS

(76) Inventors: Lawrence A. Gould, 18181 NE. 31 Ct., Apt# 409, Aventura, FL (US) 33160; John A. Stangle, 128 Bower La., Forest Hill, MD (US) 21050

( * ) Notice: Subject to any disclaimer, the term of this patent is extended or adjusted under 35 U.S.C. 154(b) by 591 days.

(21) Appl. No.: 10/983,909

(22) Filed: Nov. 8, 2004

(65) Prior Publication Data

US 2005/0135287 A1  Jun. 23, 2005

Related U.S. Application Data

(63) Continuation-in-part of application No. 09/927,992, filed on Aug. 10, 2001, now Pat. No. 6,934,548, and a continuation-in-part of application No. 09/927,192, filed on Aug. 10, 2001.

(60) Provisional application No. 60/276,120, filed on Mar. 16, 2001, provisional application No. 60/276,123, filed on Mar. 16, 2001.

(51) Int. Cl.
*H04M 11/00* (2006.01)

(52) U.S. Cl. ............... 455/404.2; 455/404.1; 455/456.1; 701/300; 340/990

(58) Field of Classification Search .............. 455/404.2, 455/404.1, 456.1; 370/328; 701/300; 340/990
See application file for complete search history.

(56) References Cited

U.S. PATENT DOCUMENTS

| 5,334,974 | A | * | 8/1994 | Simms et al. | 340/990 |
| 5,808,564 | A | * | 9/1998 | Simms et al. | 340/990 |
| 5,884,221 | A | * | 3/1999 | Wortham | 701/300 |
| 5,986,543 | A | * | 11/1999 | Johnson | 340/426.19 |
| 6,526,335 | B1 | * | 2/2003 | Treyz et al. | 701/1 |

* cited by examiner

*Primary Examiner*—Danh C Le
(74) *Attorney, Agent, or Firm*—John G. Chupa

(57) ABSTRACT

The present invention relates to systems and methods to locate and recover objects equipped with tracking devices by determining the location information of the object. The system employs multiple radio direction finding (RDF) devices, which is capable of determining the angle of arrival of a radio signal. The MSC sends a request along with radio information to a location processor, which controls the RDF devices. The system also employs a theft detection device, which is capable of placing a wireless telephone call to a monitoring center. The theft detection device connects to and receives instructions from the monitoring center, which retrieves the instructions from a primary database server. If the primary database server is unavailable, the request for information is sent to a secondary database server.

7 Claims, 10 Drawing Sheets

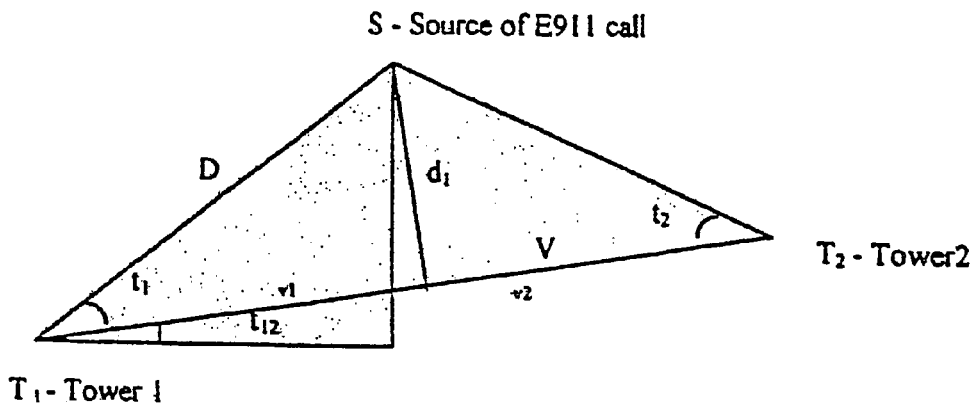

DEFINITIONS $d_1$ is the perpendicular distance from Source, S, to the vector, V, connecting $T_1$ and $T_2$
D is the derived distance from S to $T_1$
V is the length of the vector from $T_1$ to $T_2$
$v_1$ is the distance from $T_1$ to $d_1$
$t_1$ is the angle from S to $T_2$
$t_{12}$ is the angle at $T_1$ from the vector, V, to a line representing the Latitude of $T_1$
$t_2$ is the angle from S to $T_1$
V is the sum of $v_1$ and $v_2$ $$v_1 = V \, (\text{tangent } t_2) / [(\text{tangent } t_1) + (\text{tangent } t_2)] \quad \text{Equation 1}$$

$$D = v_1 / \cos t_1 \quad \text{Equation 2}$$

$$\text{Source Latitude} = T_1 \text{ Latitude} + D \sin(t_1 + t_{12}) \quad \text{Equation 3}$$

$$\text{Source Longitude} = T_1 \text{ Longitude} + D \cos(t_1 + t_{12}) \quad \text{Equation 4}$$

FIG 5

SYSTEMS AND METHODS FOR DISTRIBUTED PROCESSING OF LOCATION INFORMATION ASSOCIATED WITH EMERGENCY 911 WIRELESS TRANSMISSIONS

RELATED APPLICATION

This application is a continuation-in-part of the U.S. patent application Ser. No. 09/927,992, Method for Detecting, Computing and Disseminating Location Information Associated with Emergency 911 Wireless Transmissions, filed on Aug. 10, 2001 now U.S. Pat. No. 6,934,548, applicants being Lawrence A. Gould and John A. Stangle, which is incorporated herein by reference, and also a continuation-in-part of the U.S. patent application Ser. No. 09/927,192, Method for Employing Location Information Associated with Emergency 911 Wireless Transmissions for Complementary and Supplementary Purposes, filed on Aug. 10, 2001, applicants being Lawrence A. Gould and John A. Stangle, which is incorporated herein by reference. This application also claims priority to the U.S. Provisional Application No. 60/276,120, Method for Determining, Computing and Disseminating Location Information Associated with Emergency 911 Wireless Transmissions, filed on Mar. 16, 2001, and the U.S. Provisional Application Ser. No. 60/276,123, Method for Employing Location Information Associated with Emergency 911 Wireless Transmissions for Supplementary and Complementary Purposes, filed on Mar. 16, 2001. All referenced provisional applications are herein incorporated by reference.

TECHNICAL FIELD

This invention is related to the field of telecommunications, particularly to radiotelephony, and more particularly to distributed processing of requests from a radiotelephone.

BACKGROUND OF THE INVENTION

There are several obstacles to minimize damages caused by vehicle theft, and among them is the quick recovery. The recovery of a stolen vehicle hinges on early notification about the theft and quick localization of the vehicle. Currently, many theft prevention and recovery systems are available for consumers, but most of them either do not address the problems above simultaneously or are expensive for most car owners.

A typical automobile theft prevention device includes sensors disposed around a vehicle that detect designated events. These designated events typically include unauthorized entry, excessive movement of the vehicle, unauthorized attempts to start the vehicle, and unauthorized attempts to remove one or more components located within the vehicle. Unauthorized entry events typically include the opening of the hood, the opening of the trunk, and the opening of the vehicle's doors. One or more motion sensor is typically used to determine whether there is sufficient movement of the vehicle so as to indicate a possible theft. This provides a triggering of the alarm when there is an attempt to tow the vehicle or place the vehicle on a car carrier. Unauthorized attempts to start the car also indicate possible vehicle theft. In addition, attempts to remove a component such as a stereo or a CD player also may indicate a possible theft.

Upon occurrence of an unauthorized event, the alarm triggers as an attempt to scare the thief off. However, the owner is not notified, unless the owner is nearby and able to hear the alarm. When the owner realizes the vehicle is stolen, often the vehicle is miles away and the owner is powerless to do anything.

Some inventions have been made to allow vehicle owners to remotely shut down vehicles after they have been stolen. A system that provides, this capability through wireless transmission technology is described in U.S. Pat. No. 5,276,728, Remotely Activated Automobile Disabling System, to Pagiliaroli (Jan. 4, 1994), which is hereto incorporated by reference. However, Pagiliaroli's system does not provide any indication about the location of a stolen vehicle after it has been disabled.

Once the vehicle is stolen, the recovery is not easy, unless it can be located rapidly. There are few devices that aid vehicle recovery, and a well known one is LOJACK™. LOJACK™ is a relative expensive system that provides after-the-fact retrieval system. The system requires local law enforcement agencies to be equipped with a special tracking system besides an individual device to be installed on vehicles. The device is always in a receiving mode and it is triggered by a radio signal. After the system is triggered, it emits a radio signal, which has a ground range of only a few miles, that allows law enforcement personnel to track its location and ultimately to locate the vehicle.

Another well-known system is OnStar™, which uses Global Positioning System for locating a vehicle and wireless telephone network for communicating with its occupants. Global Positioning System (GPS) satellite technology works by measuring how long it takes a radio signal from a satellite to reach a vehicle, and then calculating distance using that time. Radio waves travel at the speed of light, which is 186,000 miles per second. GPS satellites are launched into very precise orbits and are constantly monitored by the Department of Defense to measure their altitude, position, and speed. Both the satellite and the GPS receiver in the vehicle are generating the same signal, called a pseudo-random code. OnStar™ can calculate the time by comparing how late the satellite's pseudo-random code is compared to the receiver's. That time difference is then multiplied by 186,000 miles per second, giving a vehicle's distance from one satellite. To get the most accurate vehicle location, OnStar™ uses the measurement from four satellites.

The aforementioned systems either require special support from local law enforcement authorities to locate the stolen vehicles or require the vehicles to be equipped with expensive GPS tracking equipment for determining their locations.

SUMMARY OF THE INVENTION

Briefly described, the present invention is a system and method that provide fault tolerant capability to stolen vehicles recovery, and emergency roadside assistance systems, where these systems employ wireless telecommunication technology and location information of a wireless device to locate and recover stolen vehicles or valuable objects. According to the present invention, a vehicle is equipped with an anti-theft device capable of making wireless calls to a monitoring center. There multiple monitoring centers distributed geographically and each monitoring center is capable of locating the vehicle, which is within the geographical region of the monitoring center, through a wireless network configured with multiple radio-direction-finding (RDF) devices in multiple wireless transmission antenna sites, one RDF device per each transmission antenna site. The RDF devices are connected to a location processor, where the position calculations are performed. The location processor is in communication with a Mobile Switching Center (MSC) that is handling the communication with the radiotelephone. The monitoring center is also capable of sending special commands to the anti-theft device for shutting down or otherwise immobilizing the vehicle.

Each monitoring center is connected through a data network, such as the Internet, to a database server. There is a plurality of database servers distributed geographically, and each database server supports multiple monitoring centers. A database server is designated as the primary database server for a set of monitoring centers, while serving as a secondary database server for the rest of monitoring centers. A monitoring center obtains subscriber information and prescribed actions for a given subscriber from its primary database server.

A vehicle owner may purchase a theft detection device and corresponding theft monitoring service from a theft monitoring service provider. The theft detection device can be any commercially available theft detection device capable of connecting to a theft monitoring center through a wireless telephone network. The vehicle owner can predetermine actions to be taken upon occurrence of certain events and the prescribed actions are stored in a database accessible by the theft monitoring center.

The theft detection device may be programmed to place a call to the theft monitoring center upon occurrence of some specified events. A specified event may be the pressing of the panic button, activation of an air bag, unauthorized use of the vehicle, etc. The theft detection device serves as a tracking device while it is in communication with the monitoring center.

The theft monitoring center may also initiate a call to a theft detection device installed on a vehicle after receiving a call from its owner. An owner, upon realizing his automobile has been stolen, can place a call to a theft monitoring center to report the stolen vehicle. The theft monitoring center will then place a call to the stolen vehicle and at the same time request that the position of the stolen vehicle be determined.

Typically, the call and the request are routed through a Public Switched Telephone Network (PSTN) to a Mobile Switching Center (MSC), and the MSC routes the call to the theft detection device installed on the stolen vehicle. After the call is answered by the theft detection device and the connection established between the theft detection device and a base station (BS) of a wireless telephone network, the MSC forwards the location request to a location processor along with radio signal information.

The location processor is a processor that controls a plurality of RDF devices and determines the location of a radio signal's source. The location processor obtains the radio signal's information (frequency, time slot, channel, etc.) from the MSC and sends this information to the RDF devices. Each RDF device attempts to determine the angle of arrival of radio signals relative to the position of the RDF device. Preferably, two or more RDF devices can determine the angles of arrival. This information is sent to the location processor.

The location processor uses the angle of arrival information and the information on the location of RDF devices to calculate the geographical coordinates of the source of the radio signal. The geographical coordinates calculated are then used to determine the street address of the caller.

If more than two RDF devices detect the radio signal, the location processor will determine several pairs of geographical coordinates by pairing RDF devices differently. Using these pairs of geographical coordinates, the location processor will determine the location of the source of the radio signal.

If only one RDF device detects the radio signal, then the angle of arrival is provided to the MSC and the location processor does not calculate the location of the radio signal's source.

After the street address is determined, the location processor sends it to the theft monitoring center. The theft monitoring center can then take appropriate action such as requesting police assistance, shutting down the vehicle, etc.

The monitoring center takes action by following a list of actions prescribed by a subscriber. The list of prescribed actions is stored in a database server that is accessible through a data network. Typically, there is multiple database servers geographically distributed to serve a wide region. Each monitoring center is assigned a primary database server and other database servers serve as secondary database servers for this monitoring center. The secondary database servers are used when the primary database server is not available.

DESCRIPTION OF THE DRAWINGS

The foregoing and other aspects and advantages of the invention described herein will be better understood from the following detailed description of one or more preferred embodiments of the invention with reference to the drawings in which:

FIG. 5 is an illustration of the triangulation method.

DETAIL DESCRIPTION OF THE INVENTION

Figure 1:
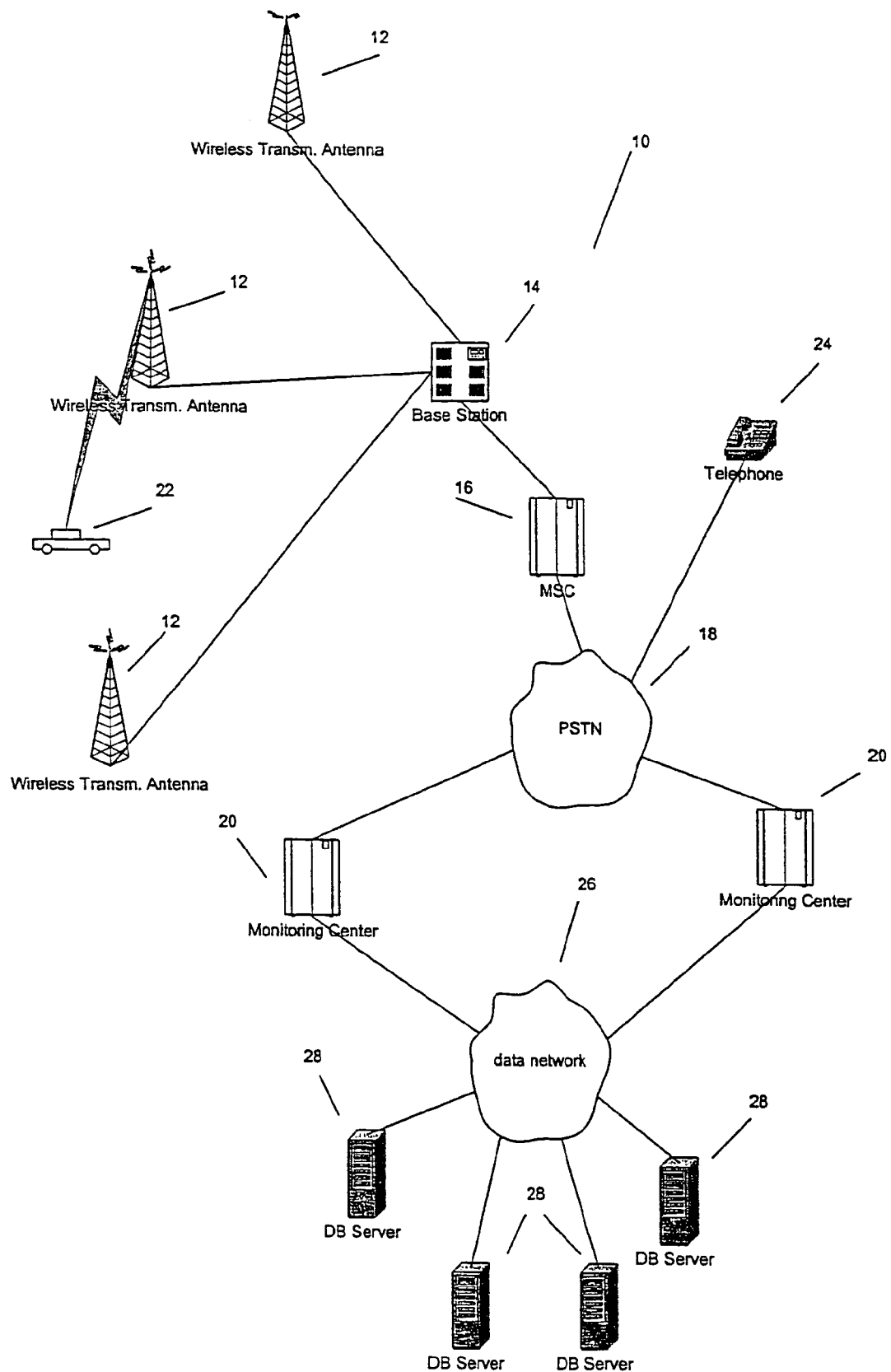
FIG. 1 depicts architecture of a wireless communication network.

Referring now in greater detail to the drawings, in which like numerals represent like components throughout several views, FIG. 1 depicts architecture of a wireless communication network 10 that support the present invention. The wireless communication network 10 has a plurality of communication antennas 12, also known as wireless transmission antennas, connected to a base station (BS) 14. The wireless transmission antennas 12 are distributed geographically to cover a wide area, and each antenna 12 typically covers a "cell." A BS 14 may support one or more transmission antennas 12 and are in communication with a MSC 16. A MSC 16 may support several BS' 14.

The wireless telephone network 10 may employ different technologies, such as CDMA (code division multiple access), TDMA (time division multiple access), GSM (Global System for Mobile Communications), FDMA (frequency division multiplex access), etc. Each technology may use a different protocol and method for communication between a radiotelephone 22 embedded in a theft detection device on a vehicle and a wireless transmission antenna 12.

The MSC 16 performs call-processing function for the wireless communication system 10. The MSC 16 routes a call from a mobile device or a radiotelephone 22 to its destination.

The call routing may be through a Public Switched Telephone Network (PSTN) 18. If a theft detection device automatically dials a telephone number for the monitoring center 20 through the embedded radiotelephone 22, a transmission antenna 12 receives the call and forwards to a BS and the MSC 16. The MSC 16 routes the call through the PSTN to the monitoring center 20, where the call will be answered.

There is one monitoring center 20 per each geographic region and there may be multiple monitoring centers 20 to cover a state or a country. A user in Atlanta may be supported by a monitoring center 20 that is different from the monitoring center 20 supporting Miami.

Each monitoring center 20 is supported by a database server 28, where it obtains instructions. Each database server 28 may support multiple monitoring centers. In one embodiment, there may be four database servers 28 located in four different cities, such as Atlanta, New York, Chicago, and Los Angeles. Each database server 28 acts as the primary database server for one set of monitoring centers 20 and as the secondary database server for other monitoring centers 20. If a monitoring center 20 requests information from its primary database server 28 and its primary database server 28 is down or out of service, the request is routed to a secondary database server 28.

The database servers are interconnected through a data network 26. The network 26 may be, or may include as a segment, any one or more of, for instance, the Internet, an intranet, a LAN (Local Area Network), WAN (Wide Area Network) or MAN (Metropolitan Area Network), a frame relay connection, Advanced Intelligent Network (AIN) connection, a synchronous optical network (SONET) connection, a digital T1, T3, or E1 line, Digital Data Service (DDS) connection, DSL (Digital Subscriber Line) connection, an Ethernet connection, ISDN (Integrated Services Digital Network) line, a dial-up port such as a V.90, V.34 or V.34bis analog modem connection, a cable modem, an ATM (Asynchronous Transfer Mode) connection, FDDI (Fiber Distributed Data Networks) or CDDI (Cooper Distributed Data Interface) connections, WAP (Wireless Application Protocol), GPRS (General Packet Radio Service), GSM (Global System for Mobile Communication) or CDMA (Code Division Multiple Access) radio frequency links, RS-232 serial connections, IEEE-1394 (Firewire) connections, USB (Universal Serial Bus) connections or other wired or wireless, digital or analog interfaces or connections.

A subscriber can also report a vehicle theft by using a telephone 24 connected to a PSTN 18. After receiving the call, the monitoring center 20 may initiate a call to the theft detection device and to get the vehicle's location.

Typically, the monitoring center 20 needs to know the location of the call in order to dispatch emergency service personnel to the location, if needed. The location information may be provided by the wireless communication network 10 that is equipped with location finding devices.

A RDF device installed on a wireless transmission antenna 12 can provide information about the angle of arrival of a radio signal. The present invention employs a commercially available RDF device, which functionality is explained by the U.S. Pat. No. 4,263,597, Nondisruptive ADF System, to Bentley (Apr. 21, 1981) and U.S. Pat. No. 4,317,120, Sector Scan ADF System, to Bentley (Feb. 23, 1982). Both aforementioned patents are hereto incorporated by reference. An example of such RDF device is a LF/HF/VHF/UHF/MW Direction Finder from TechComm.

Figure 2:
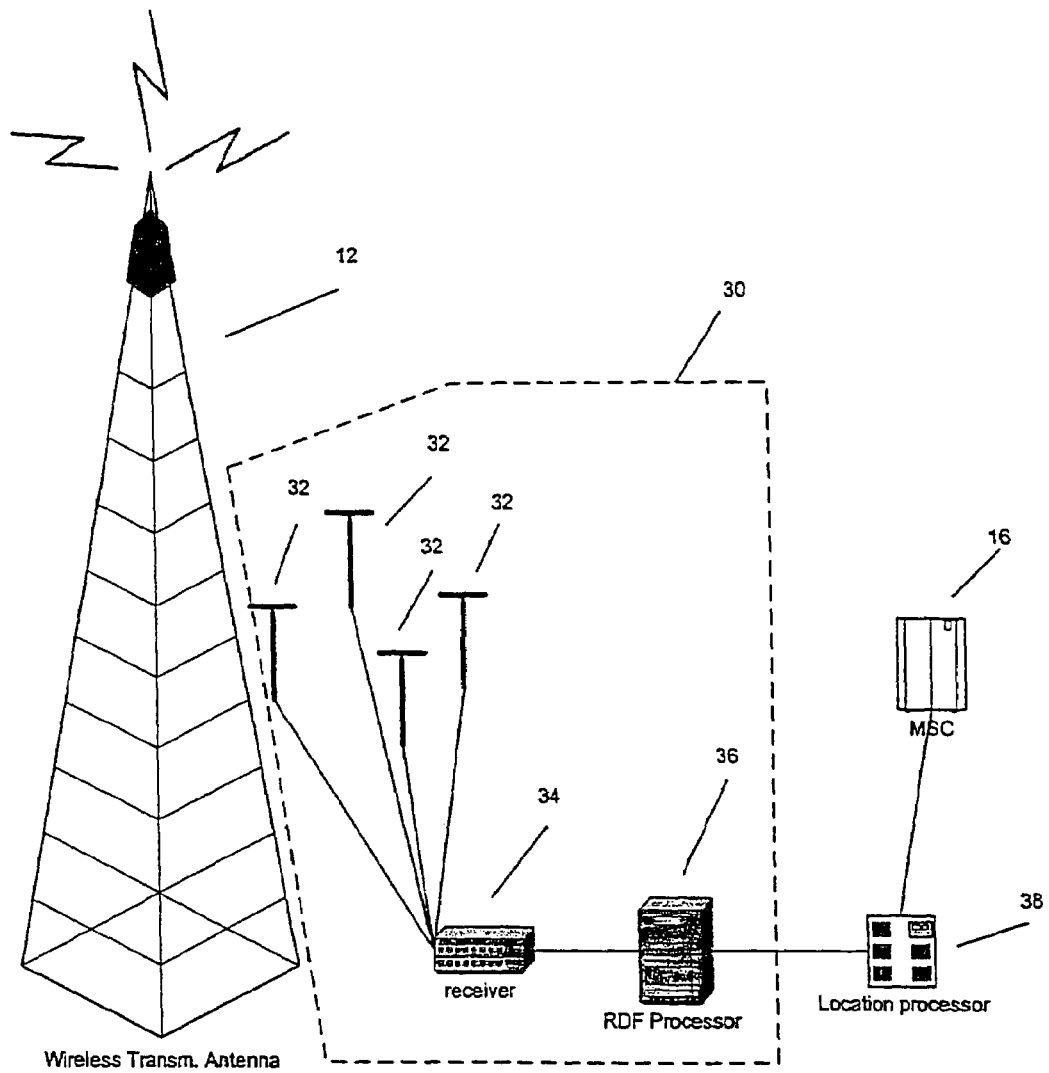
FIG. 2 depicts a RDF device installed on a wireless antenna.

FIG. 2 is an illustration of a RDF device 30 installed on a wireless transmission antenna 12. Generally, one RDF device 30 is installed to one wireless transmission antenna 12. A RDF device 30 typically has a set of antennas 32 connected to a receiver 34 and controlled by a RDF processor 36. The RDF device 30 tries to determine the angle of arrival of a radio signal by sequentially sampling the radio signals through each of the antennas 32 attached to the receiver 34. The receiver 34 demodulates the signal received before sending them to the RDF processor 36 for processing. The RDF processor 36 processes the signal received and attempts to determine the angle of arrival of the signal received. The RDF processor 36 controls the sampling of radio signals by the antennas 32 and determines which radio frequency, channel, or time slots to sample.

In an alternate embodiment, the receiver 34 and the RDF processor 36 may be enclosed in one physical unit, i.e., the receiver 34 and the RDF processor 36 may be different circuits of a single RDF device. In yet another embodiment, the functions of receiver 34 and the RDF processor 36 may be implemented through software in the RDF device.

Generally, the RDF processor 36 is in communication with a location processor 38. The location processor 38 preferably is connected to and receives information from multiple RDF devices 30. The location processor 38 is also connected to a MSC 16. The location processor 38 receives radio signal information, such as radio frequency used, time slot, the radiotelephone's mobile identification number (MIN) and electronic serial number (ESN), etc., about the emergency call from the MSC 16.

The radio signal information received from the MSC 16 is dependent on the technology used to implement the wireless network 10. For example, the radio signal information for a CDMA based wireless network is different for a TDMA based wireless network. A GSM based wireless network uses yet another different radio signal information.

The location processor 38 transmits the radio signal information to multiple RDF devices 30, so each RDF device 30 can attempt to track this radio signal. It is preferred if the radio signal from an emergency call can be tracked by more than one RDF device 30. Each. RDF device 30 provides a unique angle of arrival information, which when combined with the information from other RDF devices 30 allows calculation of the physical location of the transmitting device.

Figure 3:
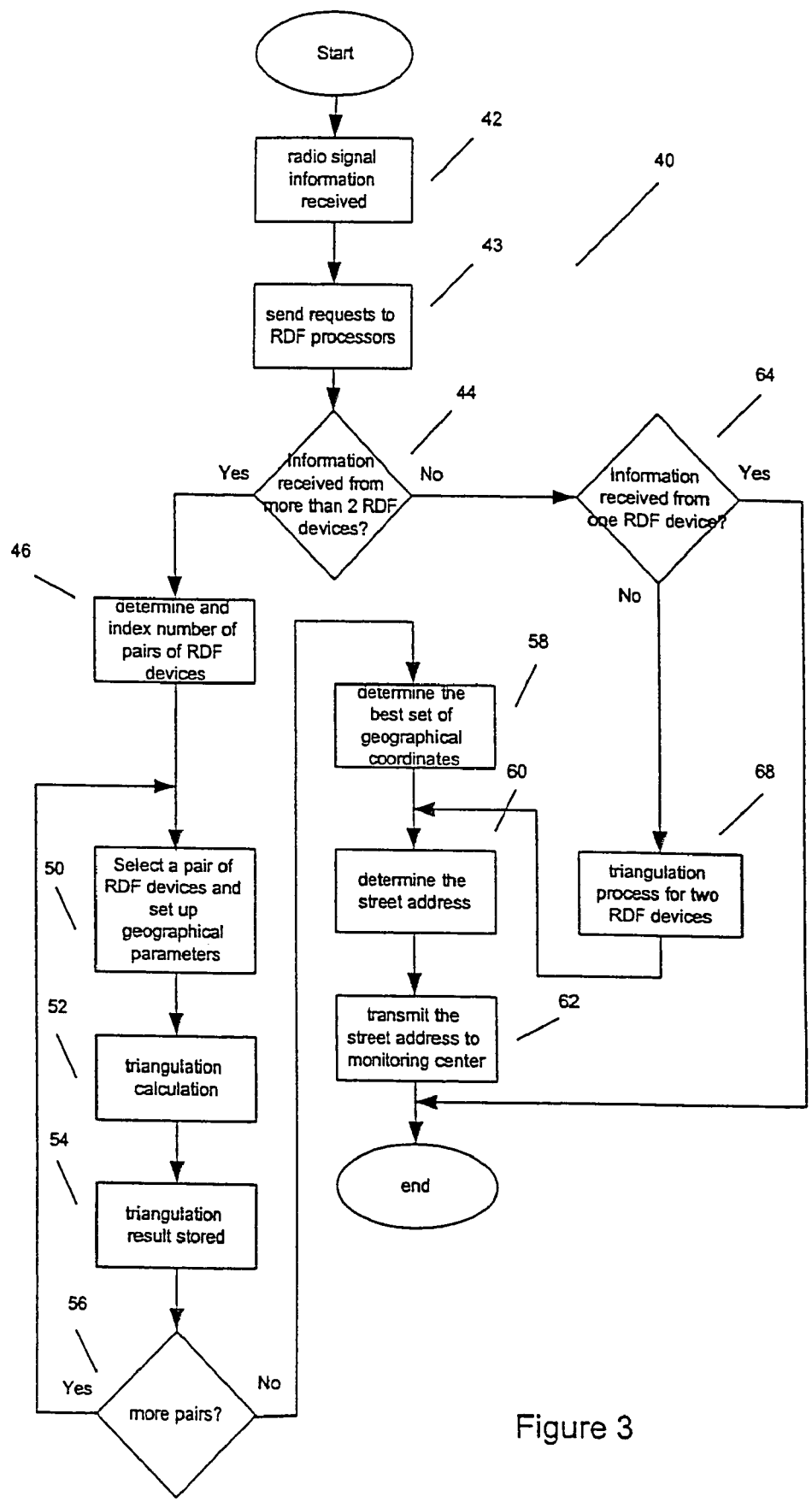
FIG. 3 is a block diagram for a location calculation process.

FIG. 3 is a block diagram of a location calculation process 40 performed by a location processor 38. The process starts when the location processor 38 receives from a MSC 16 information about the radio signal of a wireless call, block 42. The location processor 38 sends this information to RDF devices 30 and requests the RDF devices to scan for the radio signal of this call, block 43. Each RDF device 30 scans for the radio signal and attempts to determine the angle of arrival of the radio signal. After determining the angle of arrival, the RDF devices 30 send this information to a location processor 38.

When a location processor 38 receives information, it checks whether the information is from more than two RDF devices 30, block 44, i.e., whether the radio signal has been "tracked" or "detected" by two or more RDF devices 30. If more than two RDF devices 30 receive the radio signal, they are paired and indexed, block 46. The RDF devices 30 are paired because the calculation process, which uses a triangulation method, requires information from two RDF devices 30. The RDF devices 30 are paired between them in such a way that three RDF devices 30, A, B, and C will yield to three pairs of RDF devices 30, AB, BC, and AC.

After the RDF devices 30 are paired and indexed, the location processor 38 selects one pair for calculation, block 50. The geographical parameters of each RFD device, which is the same as the location of the wireless transmission antenna site, are stored in a database accessible to the location processor 38. The geographical parameters include, but not limited to longitude and latitude of each antenna site and the distance between the antenna sites. The geographical parameters are used for the triangulation calculation, block 52.

After the calculation, the result is stored, block 54, and the location processor 38 checks whether there are more RDF device pairs to be calculated, block 56. If there are additional pairs, then blocks 50, 52, and 54 are repeated until all pairs are used for the calculation. The result of the triangulation calculation is a pair of geographical coordinates of the source of the radio signal, i.e., the source's longitude and latitude.

After all pairs have been used for the calculation and all results stored, the location processor 38 proceeds to determine the "best fit" of geographical coordinates, block 58. The best fit of geographical coordinates may be determined by a simple average of coordinates or by a weighted average taking into account any obvious anomalies in location information. If one coordinate is far afield from the others, it may be caused by malfunctioning of an equipment, data contamination, etc., and this should be considered and compensated. Other statistical models may also be used to determine the best fit.

The best fit is recorded, presumed to be accurate, and used to determine the street address. The best fit of geographical latitude and longitude is translated into street or highway addresses that are meaningful to emergency service personnel, block 60. This translation may be performed employing commercially available software and database, such as MAP-INFO.

Finally, the street address is transmitted back to the monitoring center, block 62, together with other information associated with this call. The information may be encrypted before the transmission to prevent interception and interference by others.

Back to block 44, if the information on radio signal is not received by more than two RDF devices 30, it is checked whether only one RDF device 30 receives the information, block 64. If only one RDF device 30 receives the information, then the triangulation method cannot be used and the location of the origin of the radio signal cannot be determined accurately.

If two RDF devices 30 receive the information, then the triangulation method applies only to this pair of RDF devices 30, block 68. The result of the triangulation calculation is used to determine the street address, block 60, and the street address is transmitted to the monitoring center, block 62.

Figure 4:
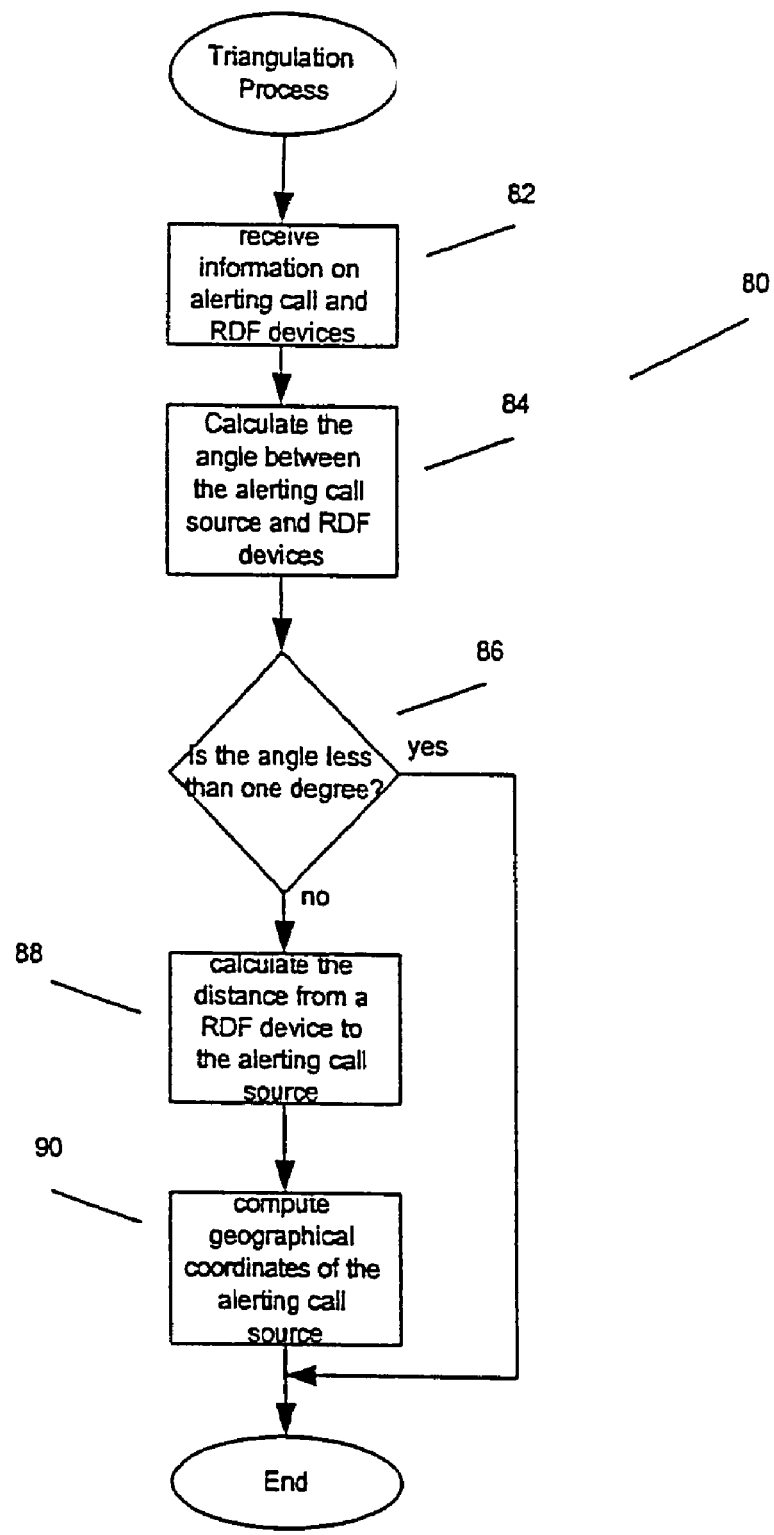
FIG. 4 is a block diagram for a triangulation calculation process.

FIG. 4 illustrates the triangulation calculation process 80. The process starts when the geographical parameters and the wireless call information are received, block 82. The triangulation process calculates the angle between the wireless call source and the RDF device 30, block 84. A check is made to determine whether the angle calculated is less than one degree, block 86. If the angle is less than one degree, it means that the source of the wireless call lies on the line between two RDF devices 30 and the triangulation method will not give accurate results. If the angle is one degree or more, then the location processor 38 can determine the distance from one RDF device 30 to the wireless call source, block 88. Using the distance between one RDF device 30 and the wireless call source, the location processor 38 can determine the geographical coordinates for the wireless call source, block 90.

FIG. 5 illustrates the triangulation method. The triangulation method assumes that the position of two points and the distance between them are known. The angular information about the third point is also known. The angular information is derived from the angle of arrival information provided by each RDF device.

Equation 1 uses the distance between the two RDF devices, which are represented by the wireless transmission antennas/towers (T1 and T2), and the angular information from two RDF devices to calculate distance v1, which is the distance from a first RDF device to point d1. d1 is a point demarked by a perpendicular line between the wireless call source and the line connecting the two RDF devices 30.

Equation 2 uses v1 to calculate the distance between the first RDF device 30 and the wireless call source.

After the distance between the first RDF device 30 and the wireless call source is calculated, the wireless call source's latitude and longitude can be easily determined using Equations 3 and 4.

Figures 6, 7:
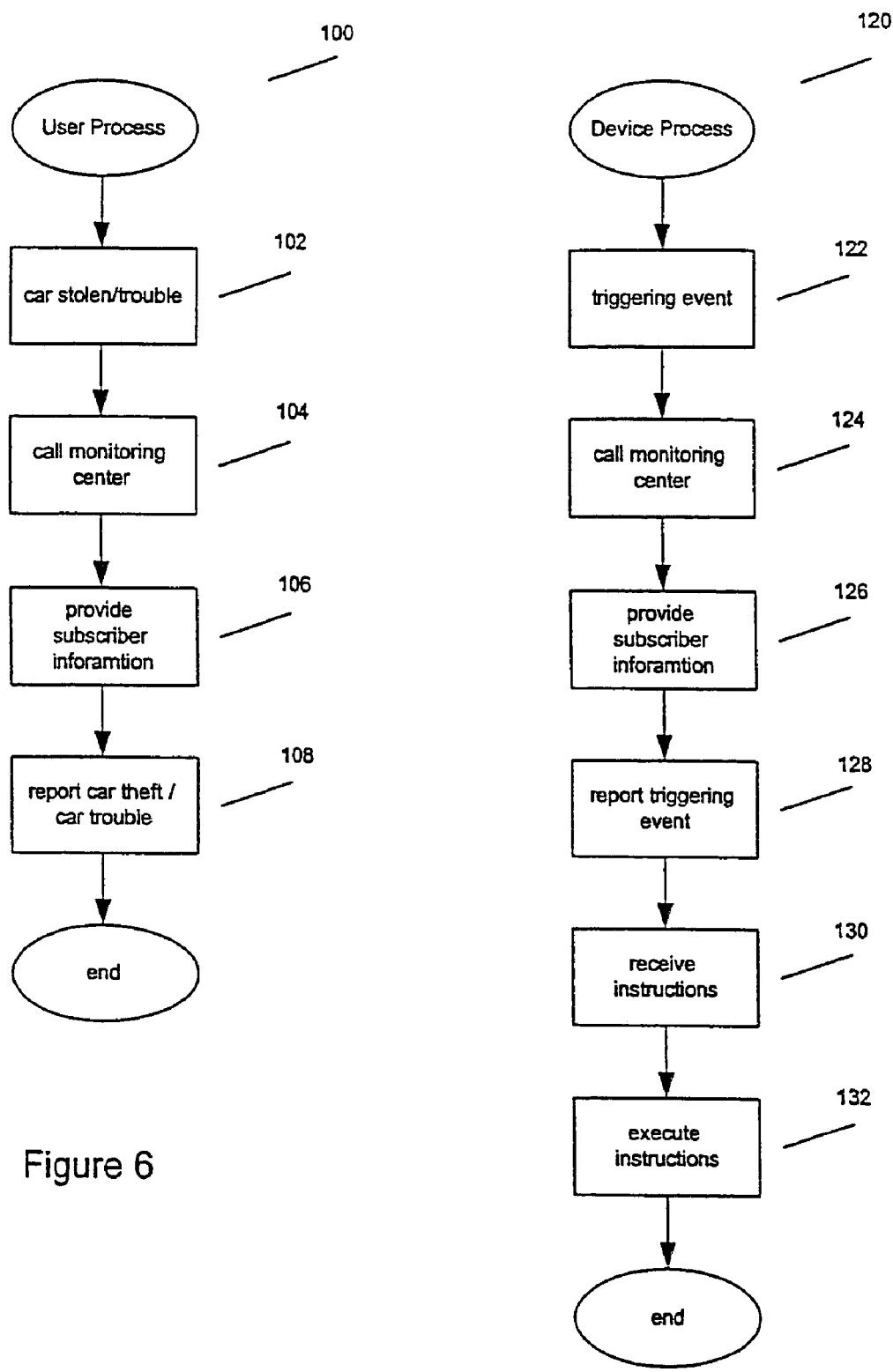
FIG. 6 is a block diagram for a user initiated process.
FIG. 7 is a block diagram for a device initiated process.

FIG. 6 depicts a user initiated process 100 according to the present invention. A user, upon realizing either having his car stolen or some car trouble, block 102, may place a call to the monitoring center, block 104. The user must subscribe to the monitoring service and provide subscriber information to the monitoring center, block 106. After being connected to the monitoring center and providing his subscriber information, the user can then report his car trouble or his stolen vehicle, block 108. The monitoring center will then take appropriate actions, which are described in FIG. 8.

FIG. 7 depicts a theft detection device initiated process 120. The theft detection device equipped with a wireless calling capability may also make a call to the monitoring center automatically. When a triggering event happens, block 122, the theft detection device automatically places a call to the monitoring center 20, block 124. A triggering event can be the activation of an air bag, the activation of a panic button, etc. The telephone number for the monitoring center 20 is preprogrammed into the theft detection device along with other subscriber information.

When the monitoring center 20 answers the call, the theft detection device needs to provide subscriber information, block 126 before reporting the triggering event 128. The monitoring center 20 will analyze the triggering event and then provide instructions accordingly. The theft detection device will receive the instructions from the monitoring center 20, block 130, and execute those instructions, block 132.

Figure 8:
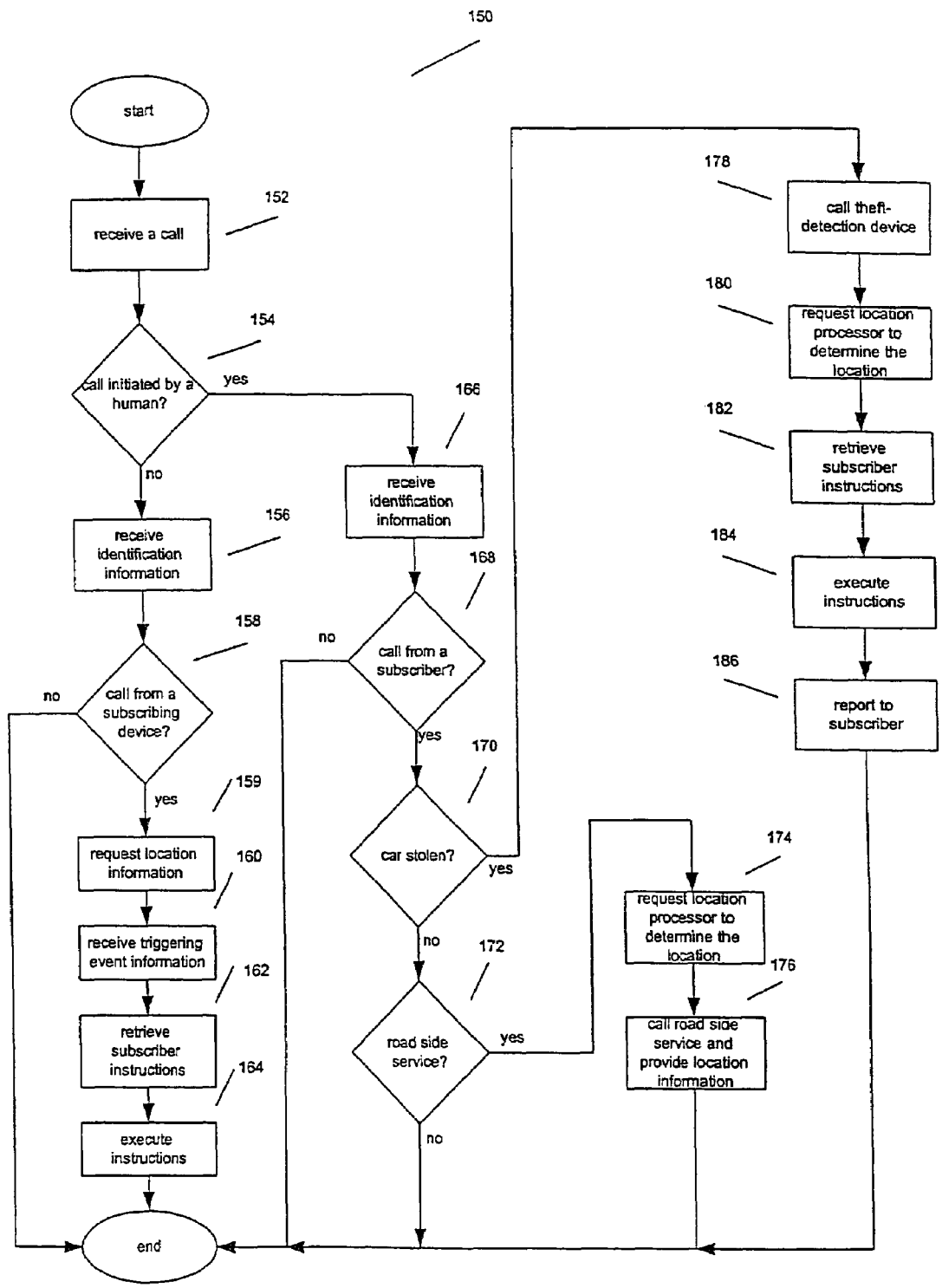
FIG. 8 is a block diagram for a monitoring center process.

FIG. 8 is a block diagram that describes a process 150 for the monitoring center 20. When the monitoring center 20 receives a call, block 152, it checks whether the call is placed by a human user or by a theft detection device, block 154. There are different ways to verify the originator of a call, and one of them may be to have one telephone number used by human callers and another telephone number to handle calls originated from the theft detection device. The caller's telephone number can be easily determined through the automatic number identification (ANI) feature provided by a telephone network.

If the call is from the theft detection device, the monitoring center gets subscriber's identification number from the theft detection device, block 156, and verifies that the device belongs to a subscriber, block 158. The monitoring center 20 verifies that the device is from a subscriber by retrieving information from a subscriber database. If the theft detection device does not belong to a subscriber, then the call is dropped. Otherwise, the monitoring center 20 requests the location information from the location processor 38, block 159, and receives information about the triggering event from the theft detection device, block 160.

For each triggering event, the subscriber may prescribe a series of actions to be taken, and this information is stored in a database server 28 accessible by the monitoring center 20. The monitoring center 20 makes a request to retrieve the list of actions corresponding to the triggering event from the database server 28, block 162, and executes the prescribed actions, block 164. The prescribed actions may include shutting down the vehicle, notifying law enforcement authorities, requesting emergency medical assistance, etc.

If a human user makes the call, the monitoring center 20 receives user's identification information, block 166, and verifies that the user is a subscriber, block 168. If the user is not a subscriber, the call is dropped. If the user is a subscriber, the monitoring center 20 checks whether the user is reporting a car theft, block 170, or needs roadside service, block 172. The monitoring center 20 may check for other services offered by the monitoring center 20.

If the user needs roadside service, the monitoring center 20 sends a request for location information to the location processor 38, block 174. After the location information is received, the monitoring center 20 connects the user to a roadside service center and forwards the user's location information to the roadside service center, block 176. The roadside service center can then provide needed service to the user by dispatching a service vehicle to user's location.

If the user reports a stolen vehicle, the monitoring center 20 retrieves user's information from the database and places a call to the theft detection device, block 178. The monitoring center 20 also requests the location processor to track the call to the theft detection device and to determine the location of the theft detection device, block 180. The monitoring device 20 retrieves a list of actions prescribed by the subscriber from a database server 28, block 182, and executes these actions, block 184. The actions may involve the monitoring center 20 transmitting a list of instructions to the theft detection device and requests the theft detection device execute these actions. Finally, the monitoring device reports to the user, block 186. The notification can be a call or an e-mail to the subscriber.

Figure 9:
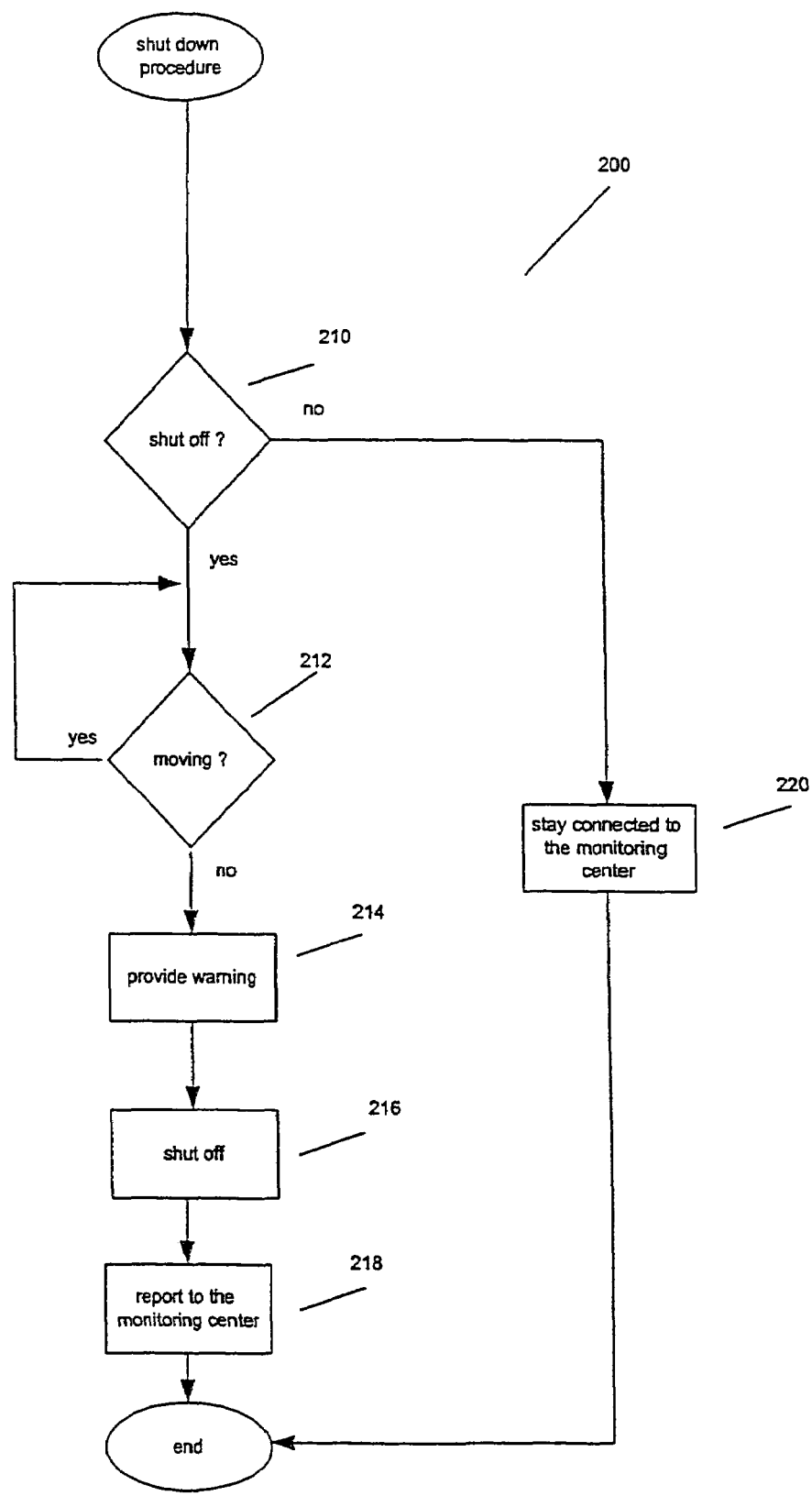
FIG. 9 is a block diagram for a shut down procedure executed by a theft detection device.

FIG. 9 is an example of actions transmitted to and taken by a theft detection device. The actions refer to a shut down procedure 200. A subscriber may wish the vehicle to be shut down after it is stolen, so it may be recovered before it is driven too far away. The prescribed action of shutting down is transmitted by the monitoring center 20 to the theft detection device. The theft detection device checks the instruction received, block 210. If the prescribed action is not for shutting down, then the theft detection device will stay connected to the monitoring center, block 220. If the instruction received is for shutting down the vehicle, the theft detection device checks whether the vehicle is moving, block 212. The shutting down procedure needs to be handled carefully as to prevent injury to innocent third parties.

If the vehicle is moving, then it will not be shut down. Instead, the theft detection device will continue to monitor until the vehicle is stopped. Shutting down a vehicle in repose is safer than a vehicle in motion. Other safety factors may be considered during the shut down procedure.

Before shutting down the vehicle, the theft detection device activates a warning, block 214. The warning can be visual, such as blinking headlights and taillights, or audio such as blowing horns intermittently. The purpose is to alert third parties about the disabling vehicle. After the warning is activated, the theft detection device shuts down the vehicle, block 216. The vehicle can be shut down by cutting electrical power to its engine or by stopping fuel flowing into the engine. After the vehicle is shut down, the theft detection device reports back to the monitoring device 20, block 218. With the vehicle immobilized and its location determined, the vehicle can be easily recovered.

In an alternate embodiment, the monitoring center may record all actions taken in response to a call from either a subscriber or a theft detection device. This record will be useful if there is any liability claim resulting from instructions executed remotely by the theft detection device.

Figure 10:
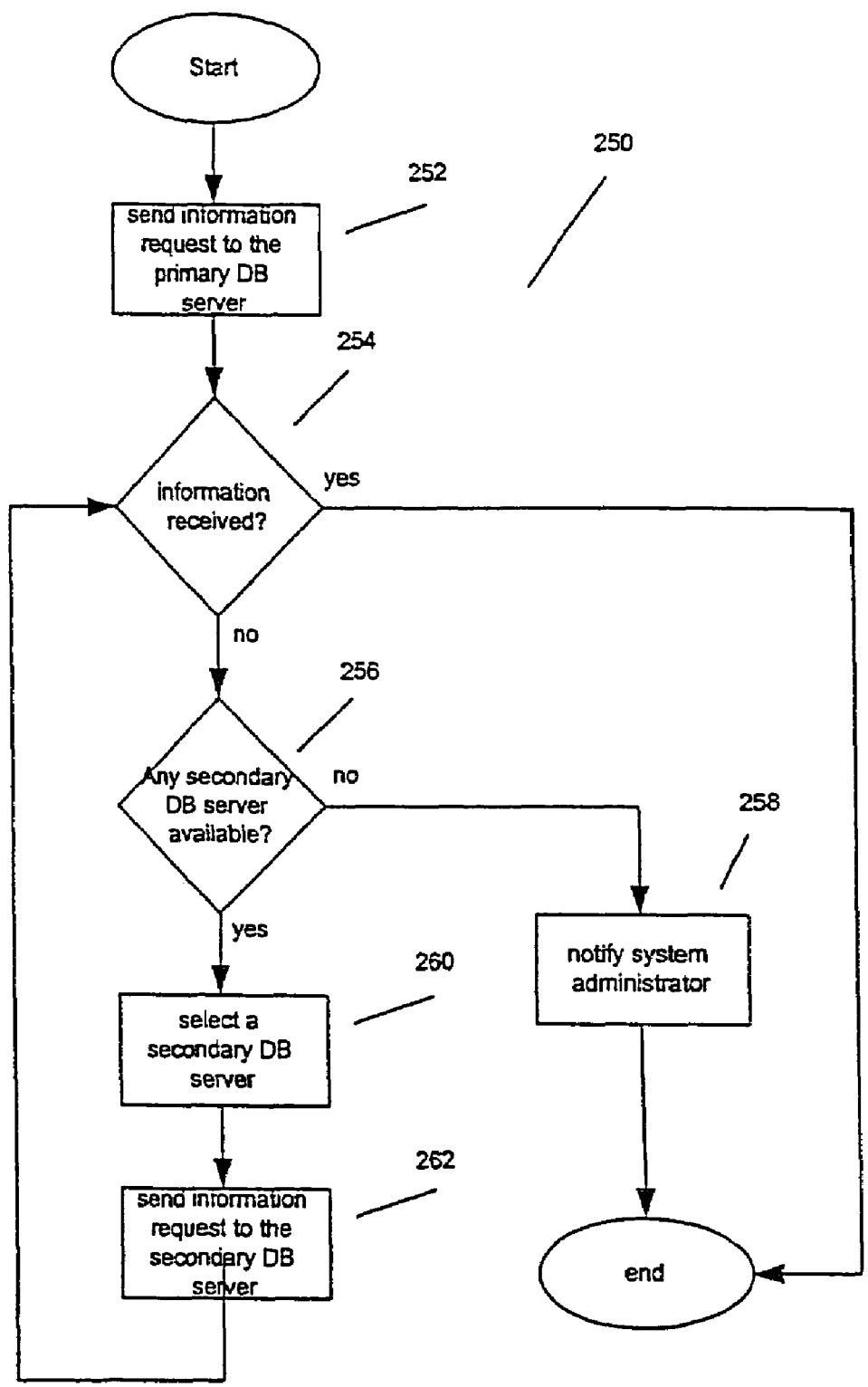
FIG. 10 is a block diagram for requesting information from a database server.

FIG. 10 illustrates a process 250 for a monitoring center 20 to request a list of prescribed actions for a particular subscriber from a database server 28. After receiving a subscriber's information, the monitoring center 20 sends an information request to its primary database server 28, block 252 and checks whether the information is received, block 254. If the information is received, then the monitoring center proceeds to execute them.

If the information is not received, the monitoring center 20 checks whether there is a secondary database server 28 available, block 256. If there is no other secondary database server 20 available to provide the information, the monitoring center 20 notifies the system administrator, block 258.

The monitoring center 20 may maintain a list of database servers 28 in its local database, where it tracks the status of each database server 28. The monitoring center 20 may employ different algorithms to select a secondary database server 20 when its primary database server 20 is unavailable. The algorithm may be implemented according to different criteria For example, the algorithm may be a simple predefined list based on the geographic location or may be based on the real time handling capacity of each database server 28.

Figure 11:
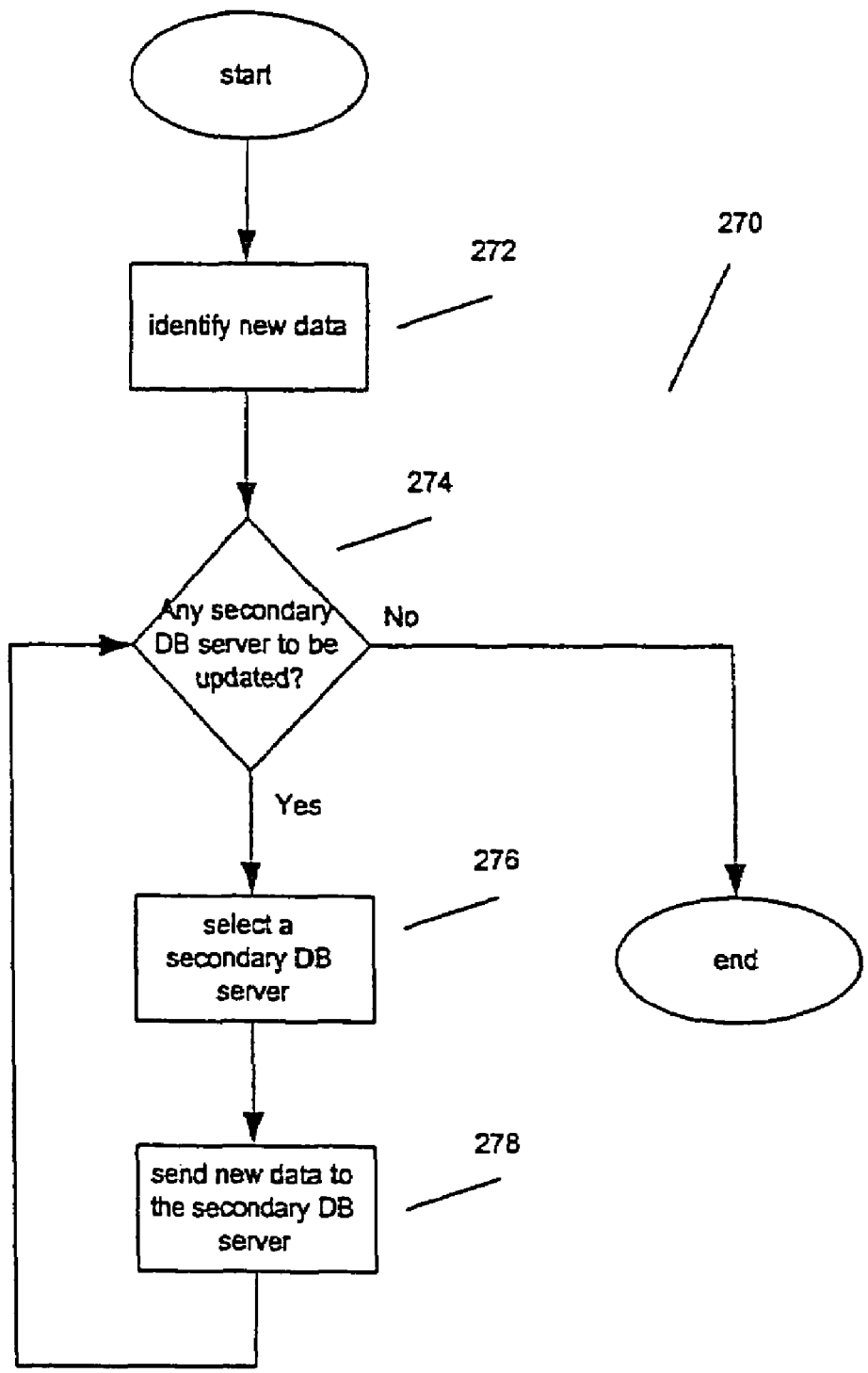
FIG. 11 is a block diagram for updating database servers.

In order for the database servers 26 to back each other up, their contents must be periodically synchronized. There are several ways to synchronize databases between multiple database servers 28 and FIG. 11 depicts one process 270 for updating databases stored in database servers 28. A primary database server 28 identifies new data, block 272, that have accumulated since the last update and checks whether there is any secondary database server 28 to be updated, block 274. If all the secondary database servers 28 have been updated, then the process ends.

If there is a database server 28 to be updated, the primary database server 28 selects a secondary database server 28 for update, block 276. There are different ways for one database server to update another database server, and one simple way is for the primary database server to send an update request with the new data to a secondary database server, block 278. The primary database server 28 repeats the process, blocks 274, 276, and 278, until there is no more secondary database left for updating. The process 270 is performed by all database servers 28.

The database update process 270 is preferably done when there is less traffic over the network, such as early morning hours or over the weekends.

The following is an exemplary description of a subscriber using a system according to the present invention to report a personal emergency situation. When the subscriber is attacked by a robber while walking toward her car, she can press the panic button on her keyless remote unit. The panic button activates the theft detection device and triggers the theft detection device to place a call to the monitoring center 20. The call is received by a wireless transmission antenna 12, which is connected to a base station 14. The base station 14 forwards the call to a MSC 16, which attempts to route the call.

After analyzing the dialed number, the MSC 16 identifies the destination number as a number assigned to the monitoring center 20 and routes the call to the monitoring center 20. The monitoring center 20 answers the call and identifies the call being initiated by the theft detection device. The monitoring center 20 sends a request to the MSC 16 to determine the location of the theft detection device. The MSC 16 sends the radio signal information related to the call to the location processor 38 and requests the location processor 38 to determine the location of the theft detection device. The radio signal information is used for tracking wireless radio signal and may include frequency, time slot, special code, etc.

The location processor 38 sends the radio signal information to all RDF devices 30. Generally, one RDF device 30 is attached to each wireless transmission antenna 12. The RDF processor 36 of the RDF device 30 sets-up the antennas 32 to tune-in to the radio signal and samples sequentially all the antennas 32. Each RDF device 30 will return information on the angle of arrival of the radio signal, if it is successful in locating the radio signal. The RDF device 30 sends the results back to the location processor 38.

The location processor 38 can determine the location of an emergency call if the location processor 38 receives the angle of arrival information from at least two RDF devices 30. If the location processor 38 receives the information from more than two RDF devices 30, then the location results can be analyzed and a "best fit" result selected.

The location processor 38 can easily translate the location information, which is expressed as longitude and latitude, into a street address through use of a commercial software or database. The street address is then transmitted to the MSC 16, which in turn sends it to the monitoring center 20.

The monitoring center 20 also receives the information on the triggering event from the theft detection device and identifies it as related to the panic button. After receiving the triggering information, the monitoring center 20 retrieves a list of prescribed actions from a database server 28. If the subscriber has specified that a Public Safety Answering Point (PSAP) or a 911 center is notified, then the monitoring center 20 will place a call to the PSAP and report the nature of the call and the location of the subscriber. The PSAP can then dispatch law enforcement officers for assistance.

In an alternate embodiment for a medical emergency application, where a system according to the present invention is used to locate and to provide assistance to people in need of medical assistance, the database server 28 may store medical information, which can retrieved and sent to a medical emergency center along with the location information of the person in need of medical assistance. In this embodiment, a person carries a medical emergency device that is capable of placing a wireless telephone call, and upon emergency the person can press a button on this medical emergency device to connect to a monitoring center. The person's position is located in the manner described above and the monitoring center forwards his location information to a medical emergency center along with his medical information. The medical emergency center can then dispatch the appropriate response team to his rescue.

In yet another alternate embodiment, the location processor may also calculate the location of the origin of a wireless call using information other than the angle of arrival. The location processor may use time difference of arrival (TDOA) information or GPS based information.

The foregoing description of preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application to enable others skilled in the art to utilize the invention and various embodiments and with various modifications as are suited to the particular use contemplated.

What is claimed is:

1. A method for providing assistance to an owner of a vehicle equipped with a theft detection device, the method comprising:
    Receiving a call from the theft detection device at a monitoring center;
    Receiving information about triggering event;
    Receiving a list of prescribed actions from a primary database server;
    Requesting a location processor to determine the location of the theft detection device;
    Receiving radio signal information related to the call from a mobile switching center;
    Sending radio signals information to a plurality of radio direction finding devices;
    Receiving angular information from at least two radio direction finding devices
    And employing a triangulation method to calculate the location of the theft detection device.

2. A method of claim 1 further comprising:
    Retrieving a list of prescribed actions from the primary database server; and transmitting prescribed actions to the theft detection device.

3. The method of claim 1 further comprising:
    Placing a call to a roadside service center; and transmitting the location information to the roadside service center.

4. The method of claim 1 further comprising:
    Recording actions taken by the monitoring center.

5. The method of claim 1 further comprises:
    Requesting the list of prescribed actions from a secondary database server does not supply the requested list of actions.

6. A method for providing assistance to an owner of a vehicle of the type having a selectively activatable air bag, said method comprising the steps of:
    providing a selectively activatable panic switch; associating a first action with the sensed activation of said air bag; associating a second action with the sensed activation of said panic switch; storing said first and second actions; sensing the occurrence of one of said first and second actions; locating said vehicle only by the use of a cellular telephone system upon the sensed occurrence of one of said first and second actions; associating a first reaction to said first action; associating a second reaction to said second action;
    after locating said vehicle, determining the identity of said sensed action; and
    performing the associated reaction of said sensed action.

7. The method of claim 6 wherein said step of location said vehicle comprises a triangulation method.

* * * * *